US010730476B2

(12) United States Patent
Akaba (10) Patent No.: US 10,730,476 B2
(45) Date of Patent: Aug. 4, 2020

(54) OCCUPANT PROTECTION DEVICE, METHOD FOR CONTROLLING OCCUPANT PROTECTION DEVICE, AND PROGRAM

(71) Applicant: HONDA MOTOR CO., LTD., Minato-ku, Tokyo (JP)

(72) Inventor: Hiroshi Akaba, Wako (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 15/915,188

(22) Filed: Mar. 8, 2018

(65) Prior Publication Data

US 2018/0257602 A1   Sep. 13, 2018

(30) Foreign Application Priority Data

Mar. 10, 2017   (JP) .................................. 2017-046810

(51) Int. Cl.
*B60R 22/48* (2006.01)
*B60R 22/44* (2006.01)
*B60W 30/00* (2006.01)

(52) U.S. Cl.
CPC .............. *B60R 22/48* (2013.01); *B60R 22/44* (2013.01); *B60W 30/00* (2013.01); *B60R 2022/4473* (2013.01); *B60R 2022/4841* (2013.01)

(58) Field of Classification Search
CPC ......... B60R 22/19; B60R 22/44; B60R 22/48; B60R 22/3405; B60R 2022/4473; B60R 2022/4841; B60W 30/00
See application file for complete search history.

(56) References Cited

U.S. PATENT DOCUMENTS

| 4,081,153 | A | * | 3/1978 | Tanaka | ..................... B60R 22/44 |
| | | | | | 242/372 |
| 6,758,495 | B2 | * | 7/2004 | Brambilla | ........... B60R 21/0132 |
| | | | | | 180/268 |
| 9,738,179 | B2 | | 8/2017 | Ebina et al. | |
| 2004/0251367 | A1 | * | 12/2004 | Suzuki | ................ B60R 21/0132 |
| | | | | | 242/390.8 |
| 2005/0252710 | A1 | * | 11/2005 | Akaba | ................... B60R 21/013 |
| | | | | | 180/268 |
| 2006/0097504 | A1 | * | 5/2006 | Akaba | ................... B60R 21/013 |
| | | | | | 280/806 |
| 2007/0017726 | A1 | * | 1/2007 | Takemura | ............... B60R 22/46 |
| | | | | | 180/268 |

(Continued)

FOREIGN PATENT DOCUMENTS

CN   104837705   8/2015
JP   2004-262259   9/2004
(Continued)

OTHER PUBLICATIONS

Yano, Takuto, Machine Translation of JP2007022285A, "Travel Control System for Vehicle" (Year: 2007).*
(Continued)

*Primary Examiner* — Anne Marie Antonucci
*Assistant Examiner* — Sahar Motazedi
(74) *Attorney, Agent, or Firm* — Amin, Turocy & Watson, LLP (57) ABSTRACT

An occupant protection device includes a drive unit which adjusts a degree of tension of a seat belt and a control unit which controls the drive unit to tension the seat belt to remove looseness of the seat belt when a vehicle has been switched from an automated driving to a manual driving.

7 Claims, 9 Drawing Sheets

(56) References Cited

U.S. PATENT DOCUMENTS

| | | | | |
|---|---|---|---|---|
| 2007/0102915 A1* | 5/2007 | Odate | ............... | B60R 21/0132 |
| | | | | 280/806 |
| 2007/0284174 A1* | 12/2007 | Odate | ................... | B60R 22/46 |
| | | | | 180/268 |
| 2008/0012282 A1* | 1/2008 | Odate | ................... | B60R 22/46 |
| | | | | 280/806 |
| 2010/0094500 A1* | 4/2010 | Jin | ....................... | G01C 21/26 |
| | | | | 701/31.4 |
| 2011/0140404 A1* | 6/2011 | Odate | ............... | B60N 2/0244 |
| | | | | 280/806 |
| 2016/0023632 A1* | 1/2016 | Odate | ................... | B60R 22/46 |
| | | | | 701/45 |
| 2018/0037225 A1* | 2/2018 | Knoller | ............ | B60W 50/0097 |
| 2018/0050659 A1* | 2/2018 | Coburn | ............... | B60K 28/066 |
| 2018/0272895 A1* | 9/2018 | Schmidt | ............... | B60N 2/0244 |

FOREIGN PATENT DOCUMENTS

| | | | | |
|---|---|---|---|---|
| JP | 2005247050 A | * | 9/2005 | |
| JP | 2006-240545 | | 9/2006 | |
| JP | 2007022285 A | * | 2/2007 | ............ B60W 30/16 |
| JP | 2009-234536 | | 10/2009 | |
| JP | 444181 | | 3/2010 | |
| JP | 2013047098 A | * | 3/2013 | |
| JP | 2018167604 A | * | 11/2018 | |

OTHER PUBLICATIONS

Terasawa, Sadahiro, Machine Translation of JP2005247050A, "Seat Belt Device" (Year: 2005).*

Midorikawa, Yukinori, Machine Translation of JP2013047098A, "Occupant Protection Device" (Year: 2013).*

Ikuto Hikari, Machine Translation of JP2018167604A, "Seat Belt Device" (Year: 2018).*

Brandenburg, S., Skottke, M., "Switching from manual to automated driving and reverse: Are drivers behaving more risly after highly automated driving?" (Year: 2014).*

Chinese Office Action for Chinese Patent Application No. 201810190962.6 dated Mar. 23, 2020.

* cited by examiner

OCCUPANT PROTECTION DEVICE, METHOD FOR CONTROLLING OCCUPANT PROTECTION DEVICE, AND PROGRAM

CROSS-REFERENCE TO RELATED APPLICATION

Priority is claimed on Japanese Patent Application No. 2017-046810, filed Mar. 10, 2017, the content of which is incorporated herein by reference.

BACKGROUND OF THE INVENTION

Field of the Invention

The present invention relates to an occupant protection device, a method for controlling an occupant protection device, and a program.

Description of Related Art

A seat belt device protects an occupant when a vehicle collision or the like occurs. Japanese Unexamined Patent Application, First Publication No. 2009-234536 (hereinafter referred to as Patent Document 1) describes a seat belt device that detects a vehicle behavior and controls the tension of a seat belt according to the detected vehicle behavior.

SUMMARY OF THE INVENTION

Automated driving of vehicles has been studied recently. An occupant sitting in a vehicle seat during automated driving may assume a more comfortable sitting posture than a sitting posture assumed during manual driving and thus their seat belt may be loosened. The technique described in Patent Document 1 does not control the seat belt according to switching between automated driving and manual driving. Therefore, when the vehicle has been switched from automated driving to manual driving, the seat belt remains in a loosened state and thus the protection of the occupant may be insufficient.

An aspect of the present invention has been made in view of such circumstances and it is an object of the present invention to provide an occupant protection device, a control method for an occupant protection device, and a program which can protect an occupant appropriately according to changes in the driving mode of a vehicle.

The present invention adopts the following configurations to achieve the above object.

(1) An occupant protection device according to an aspect of the present invention includes a drive unit configured to adjust a degree of tension of a seat belt, and a control unit configured to control the drive unit to tension the seat belt to remove looseness of the seat belt when a vehicle has been switched from an automated driving to a manual driving.

(2) In the above aspect (1), the control unit may be configured to control the drive unit to tension the seat belt to remove looseness of the seat belt also when the vehicle has been switched from the manual driving to the automated driving such that a degree of removal of the looseness when the vehicle has been switched from the automated driving to the manual driving is higher than a degree of removal of the looseness when the vehicle has been switched from the manual driving to the automated driving.

(3) In the above aspect (1) or (2), the occupant protection device may further include an output unit configured to output information, and a sensing unit configured to sense an intention of an occupant of the vehicle, wherein the control unit is configured to cause the output unit to output information asking whether or not to permit change of the degree of tension of the seat belt before changing the degree of tension of the seat belt and is configured to change the degree of tension of the seat belt when an intention to permit the change is sensed by the sensing unit.

(4) In any one of the above aspects (1) to (3), the drive unit may include an electric motor, and the control unit may be configured to control the electric motor to change the degree of tension of the seat belt when the vehicle has been switched from the automated driving to the manual driving.

(5) In any one of the above aspects (1) to (3), the drive unit may include a second biasing portion configured to wind the seat belt with a biasing force higher than a biasing force of a first biasing portion provided to wind the seat belt, and a locking mechanism configured to lock the second biasing portion, wherein the control unit is configured to control the locking mechanism to change the degree of tension of the seat belt.

(6) In any one of the above aspects (1) to (5), the occupant protection device may further include a detection unit configured to detect the degree of tension of the seat belt, wherein the control unit is configured to control the drive unit to remove looseness of the seat belt when the looseness of the seat belt is detected by the detection unit.

(7) A method for controlling an occupant protection device including a drive unit configured to adjust a degree of tension of a seat belt, the method includes causing a control computer of the occupant protection device to control the drive unit to tension the seat belt to remove looseness of the seat belt when a vehicle has been switched from an automated driving to a manual driving.

(8) A non-transitory computer readable medium storing program that causes a control computer of an occupant protection device including a drive unit configured to adjust a degree of tension of a seat belt to control the drive unit to tension the seat belt to remove looseness of the seat belt when a vehicle has been switched from an automated driving to a manual driving.

According to the above aspects (1), (7), and (8), it is possible to adjust the degree of tension of the seat belt when the vehicle has been switched from automated driving to manual driving and therefore it is possible to improve the safety of protection of the occupant.

According to the above aspect (2), the degree of tension of the seat belt is adjusted according to a change in the driving mode and therefore, it is possible to improve the safety of protection of the occupant according to the driving mode.

According to the above aspect (3), before the degree of tension of the seat belt is changed, the occupant is allowed to choose whether to permit the change of the degree of tension and therefore the occupant is prevented from being unexpectedly bound by the seat belt and the safety of protection of the occupant can be improved.

According to the above aspect (4), the degree of tension of the seat belt can be adjusted by the electric motor.

According to the above aspect (5), the degree of tension of the seat belt can be adjusted mechanically and thus power consumption can be reduced.

According to the above aspect (6), looseness of the seat belt can be removed regardless of the state of the driving mode and therefore the safety of protection of the occupant can be further improved.

DETAILED DESCRIPTION OF THE INVENTION

Hereinafter, embodiments of a vehicle system, a vehicle control method, and a vehicle control program of the present invention will be described with reference to the drawings. The vehicle system is applied to an automated driving vehicle that can perform automated driving. Manual driving described below is assumed to include a state in which relatively simple driving support such as that for following travel or lane keeping is being performed.

First Embodiment

[Overall Configuration]

Figure 1:
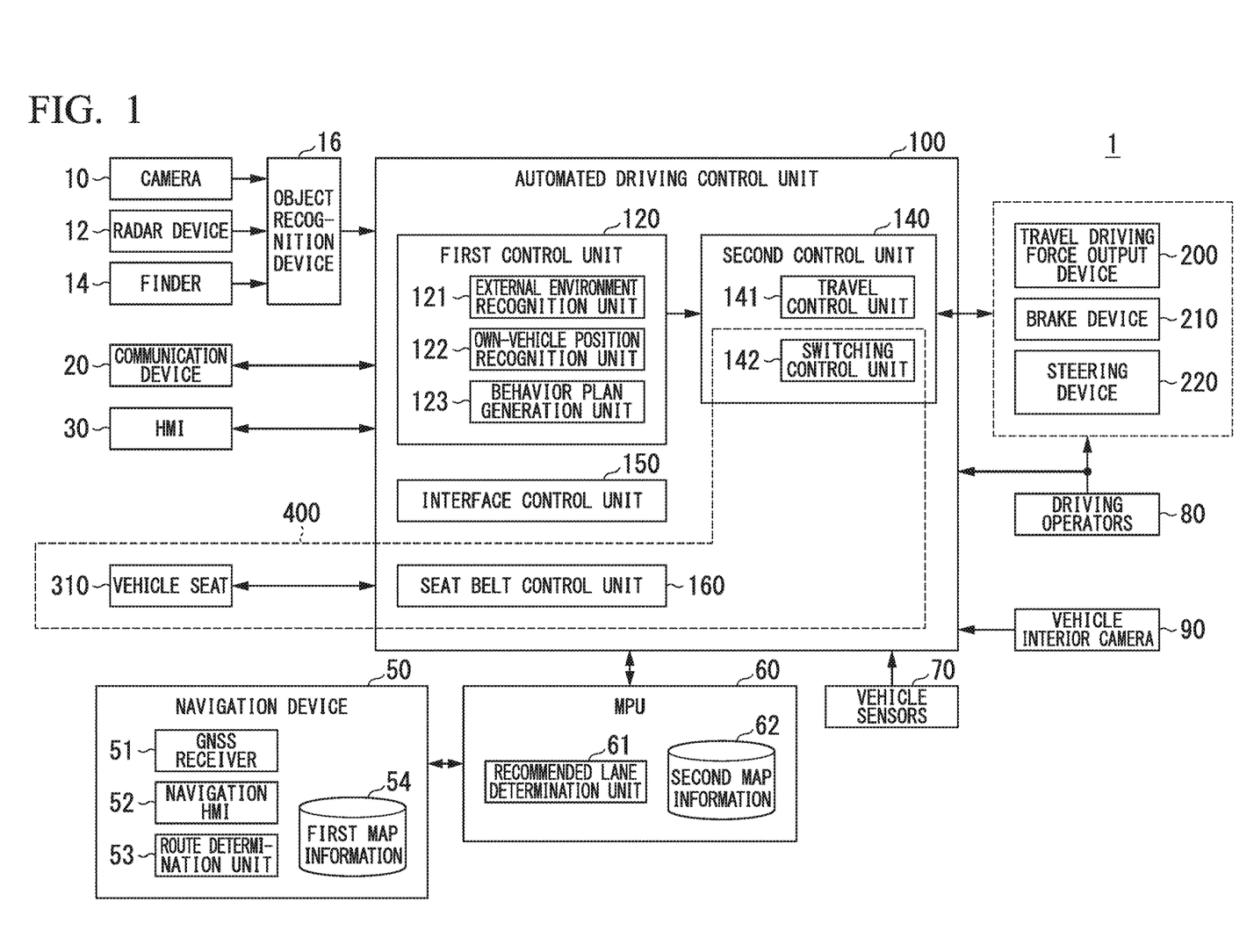
FIG. 1 is a configuration diagram of a vehicle system according to a first embodiment.

FIG. 1 is a configuration diagram of a vehicle system 1 according to a first embodiment. A vehicle in which the vehicle system 1 is mounted (hereinafter referred to as a vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle system 1 includes, for example, a camera 10, a radar device 12, a finder 14, an object recognition device 16, a communication device 20, a human machine interface (HMI) 30, a navigation device 50, a micro-processing unit (MPU) 60, vehicle sensors 70, driving operators 80, a vehicle interior camera 90, an automated driving control unit 100, a travel driving force output device 200, a brake device 210, a steering device 220, and a vehicle seat 310. These devices or apparatuses are connected to each other by a multiplex communication line or a serial communication line such as a controller area network (CAN) communication line, a wireless communication network, or the like. The components shown in FIG. 1 are merely an example and some of the components may be omitted or other components may be added.

The camera 10 is, for example, a digital camera using a solid-state imaging device such as a charge coupled device (CCD) or complementary metal oxide semiconductor (CMOS) image sensor. One or a plurality of cameras 10 may be attached to the vehicle M, in which the vehicle system 1 is mounted, at arbitrary locations. For imaging the area in front of the vehicle, a camera 10 is attached to an upper portion of a front windshield, a rear surface of a rearview mirror, or the like. For imaging the area behind the vehicle, a camera 10 is attached to an upper portion of a rear windshield, a back door, or the like. For imaging the area to the side of the vehicle, a camera 10 is attached to a door mirror or the like. For example, the camera 10 repeats imaging of the surroundings of the vehicle M at regular intervals. The camera 10 may also be a stereo camera.

The radar device 12 radiates radio waves such as millimeter waves around the vehicle M and detects radio waves reflected by an object (reflected waves) to detect at least the position (distance and orientation) of the object. One or a plurality of radar devices 12 may be attached to the vehicle M at arbitrary locations. The radar device 12 may detect the position and velocity of an object using a frequency modulated continuous wave (FMCW) method.

The finder 14 is a light detection and ranging or laser imaging detection and ranging (LIDAR) finder which measures scattered light from an object in response to illuminated light to detect the distance to the object. One or a plurality of finders 14 may be attached to the vehicle M at arbitrary locations.

The object recognition device 16 performs a sensor fusion process on results of detection by some or all of the camera 10, the radar device 12, and the finder 14 to recognize the position, type, speed, or the like of the object. The object recognition device 16 outputs the recognition result to automated driving control unit 100.

For example, the communication device 20 communicates with other vehicles near the vehicle M using a cellular network, a Wi-Fi network, BLUETOOTH®, dedicated short range communication (DSRC) or the like or communicates with various server devices via wireless base stations. The communication device 20 also communicates with a terminal device held by a person outside the vehicle.

The HMI 30 is a display unit that presents various types of information to an occupant in the vehicle and receives an input operation from the occupant. The HMI 30 includes, for example, any of various display devices, a speaker, a buzzer, a touch panel, any of various operating switches, a key, or the like.

The navigation device 50 includes, for example, a global navigation satellite system (GNSS) receiver 51, a navigation HMI 52, and a route determination unit 53 and holds first map information 54 in a storage device such as a hard disk drive (HDD) or a flash memory. The GNSS receiver specifies the position of the vehicle M on the basis of signals received from GNSS satellites. The position of the vehicle M may also be specified or may be supplemented by an inertial navigation system (INS) using the output of the vehicle sensors 70. The navigation HMI 52 includes a display device, a speaker, a touch panel, a key, or the like. The navigation HMI 52 may be partly or wholly shared with the HMI 30 described above. For example, the route determination unit 53 determines a route from the position of the vehicle M specified by the GNSS receiver 51 (or an arbitrary input position) to a destination input by the occupant using the navigation HMI 52 (for example, a route including information regarding waypoints on the route of travel to the destination) by referring to the first map information 54. The first map information 54 is, for example, information representing shapes of roads by links indicating roads and nodes connected by the links. The first map information 54 may include curvatures of roads, point of interest (POI) information, or the like. The route determined by the route determination unit 53 is output to the MPU 60. The navigation device 50 may also perform route guidance using the navigation HMI 52 on the basis of the route determined by the route determination unit 53. The navigation device 50 may be realized, for example, by a function of a terminal device such as a smartphone or a tablet possessed by the user. The navigation device 50 may also transmit the current position and the destination to a navigation server via the communication device 20 and acquire a route returned from the navigation server.

The MPU 60 functions, for example, as a recommended lane determination unit 61 and holds the second map information 62 in a storage device such as an HDD or a flash memory. The recommended lane determination unit 61 divides the route provided from the navigation device 50 into a plurality of blocks (for example, into blocks each 100 meters long in the direction in which the vehicle travels) and determines a recommended lane for each block by referring to the second map information 62. The recommended lane determination unit 61 determines the recommended lane such that the recommended lane is given a position in a lane order counted from the leftmost lane. When there is a branch point, a merge point, or the like on the route, the recommended lane determination unit 61 determines a recommended lane such that the vehicle M can travel on a reasonable travel route for proceeding to the branch destination.

The second map information 62 is map information with higher accuracy than the first map information 54. The second map information 62 includes, for example, information of the centers of lanes or information of the boundaries of lanes. The second map information 62 may also include road information, traffic regulation information, address information (addresses/postal codes), facility information, telephone number information, or the like. The road information includes information indicating the types of roads such as expressways, toll roads, national roads, or prefectural roads or information such as the number of lanes of each road, regions of emergency parking zones, the widths of lanes, the gradients of roads, the positions of roads (three-dimensional coordinates including longitude, latitude and height), the curvatures of curves of lanes, the positions of merge or branch points of lanes, signs installed on roads, or the like. The second map information 62 may be updated as needed by accessing another device using the communication device 20.

The vehicle sensors 70 include a vehicle speed sensor that detects the speed of the vehicle M, an acceleration sensor that detects an acceleration, a yaw rate sensor that detects an angular speed thereof about the vertical axis, an orientation sensor that detects the orientation of the vehicle M, or the like. The acceleration sensor may include, for example, a lateral acceleration sensor that detects a gravitational acceleration (hereinafter referred to as a "lateral acceleration") relating to a lateral direction of the vehicle M.

The driving operators 80 include, for example, an accelerator pedal, a brake pedal, a shift lever, a steering wheel, and other operators. A sensor for detecting the amount of operation or the presence or absence of operation is attached to each of the driving operators 80 and detection results thereof are output to either or both of the automated driving control unit 100 or the travel driving force output, brake, and steering devices 200, 210, and 220.

The vehicle interior camera 90 captures, for example, an image of the inside of the vehicle M. For example, the vehicle interior camera 90 captures an image of the vehicle seat 310 or the surroundings of the vehicle seat 310. For example, the vehicle interior camera 90 repeatedly captures an image of the inside of the vehicle M at regular intervals. The captured image of the vehicle interior camera 90 is output to automated driving control unit 100.

[Automated Driving Control Unit]

The automated driving control unit 100 includes, for example, a first control unit 120, a second control unit 140, an interface control unit 150, and a seat belt control unit 160. Each of the first control unit 120, the second control unit 140, the interface control unit 150, and the seat belt control unit 160 is realized by a processor such as a central processing unit (CPU) executing a program (software). Some or all of the respective functional units of the first control unit 120, the second control unit 140, the interface control unit 150, and the seat belt control unit 160 which will be described below may be realized by hardware such as a large scale integration (LSI), an application specific integrated circuit (ASIC), or a field-programmable gate array (FPGA) or may be realized by hardware and software in cooperation.

The first control unit 120 includes, for example, an external environment recognition unit 121, an own-vehicle position recognition unit 122, and a behavior plan generation unit 123.

The external environment recognition unit 121 recognizes states of a nearby vehicle or vehicles such as the position, speed and acceleration thereof on the basis of information input from the camera 10, the radar device 12, and the finder 14 via the object recognition device 16. The position of the nearby vehicle may be represented by a representative point such as a center of gravity or a corner of the nearby vehicle or may be represented by a region expressed by a contour of the nearby vehicle. The "states" of the nearby vehicle may include an acceleration or jerk of the nearby vehicle or a "behavior state" (for example, whether or not the nearby vehicle is changing or is going to change lanes).

The external environment recognition unit 121 may also recognize the positions of guardrails or utility poles, parked vehicles, people such as pedestrians, and other objects in addition to nearby vehicles.

The own-vehicle position recognition unit 122 recognizes, for example, a (traveling) lane in which the vehicle M is traveling and the relative position and attitude of the vehicle M with respect to the traveling lane. The own-vehicle position recognition unit 122 recognizes the traveling lane, for example, by comparing a pattern of road lane lines (for example, an arrangement of solid and broken lines) obtained from the second map information 62 with a pattern of road lane lines near the vehicle M recognized from an image captured by the camera 10. This recognition may be performed taking into consideration a position of the vehicle M acquired from the navigation device 50 or a result of processing by the INS.

Figure 2:
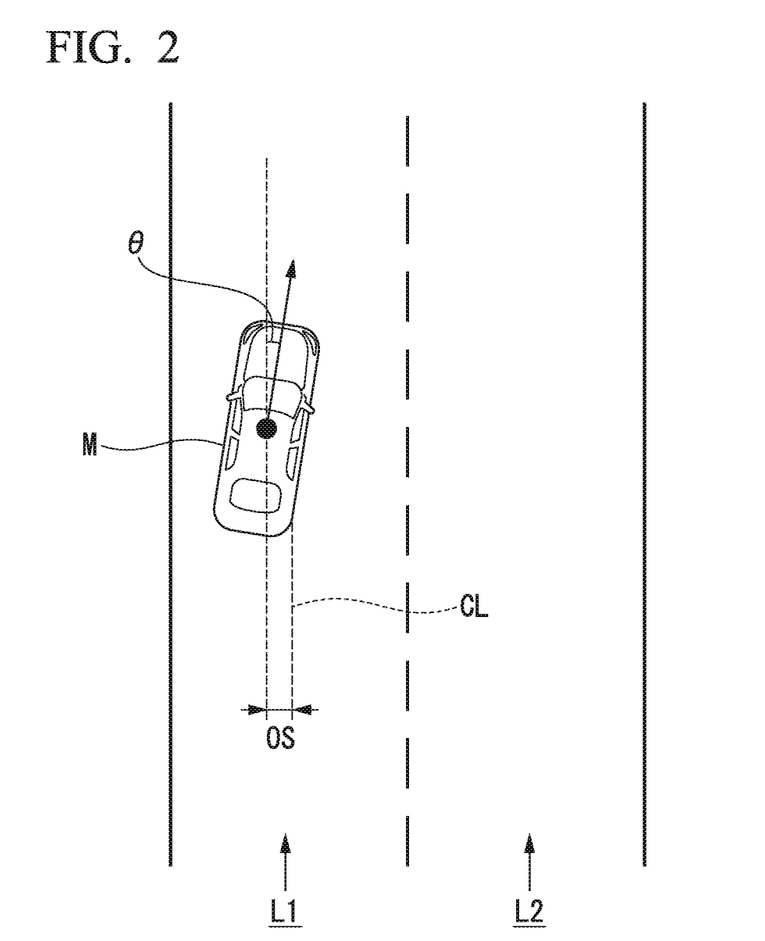
FIG. 2 is a diagram showing how the relative position and attitude of a vehicle M with respect to a traveling lane are recognized by an own-vehicle position recognition unit.

Then, the own-vehicle position recognition unit 122 recognizes, for example, the position or attitude of the vehicle M with respect to the traveling lane. FIG. 2 is a diagram showing how the relative position and attitude of the vehicle M with respect to the traveling lane L1 are recognized by the own-vehicle position recognition unit 122. For example, the own-vehicle position recognition unit 122 recognizes both a deviation OS from a traveling lane center CL of a reference point (for example, the center of gravity) of the vehicle M and an angle θ formed by the travel direction of the vehicle M relative to an extension line of the traveling lane center CL as the relative position and attitude of the vehicle M with respect to the traveling lane L1. Alternatively, the own-vehicle position recognition unit 122 may recognize the position of the reference point of the vehicle M with respect to one of the sides of the traveling lane L1 or the like as the relative position of the vehicle M with respect to the traveling lane. The relative position of the vehicle M recognized by the own-vehicle position recognition unit 122 is provided to the recommended lane determination unit 61 and the behavior plan generation unit 123.

The behavior plan generation unit 123 generates a behavior plan for the vehicle M to perform automated driving to the destination or the like. For example, the behavior plan generation unit 123 determines events which are to be sequentially performed in the automated driving control such that the vehicle M travels in the recommended lane determined by the recommended lane determination unit 61 and copes with situations occurring near the vehicle M. Events in the automated driving of the first embodiment include, for example, a constant-speed travel event which is an event of traveling in the same traveling lane at a constant speed, a lane change event which is an event of changing the traveling lane of the vehicle M, an overtaking event which is an event of overtaking a preceding vehicle, a following travel event which is an event of traveling behind a preceding vehicle, a merging event which is an event of causing the vehicle to merge at a merge point, a branching event which is an event of causing the vehicle M to travel in a target direction at a branch point of the road, an emergency stop event which is an event of causing the vehicle M to make an emergency stop, and a handover event which is an event of terminating automated driving and switching to manual driving. During execution of these events, behaviors for avoidance may sometimes be planned on the basis of situations occurring near the vehicle M (such as the presence of nearby vehicles and pedestrians or lane narrowing due to road construction).

The behavior plan generation unit 123 generates a target trajectory along which the vehicle M will travel in the future. The target trajectory includes, for example, velocity components. For example, the target trajectory is generated as a set of target points (trajectory points) to be reached at a plurality of future reference times which are set at intervals of a predetermined sampling time (for example, about tenths of a second). Therefore, when the distance between trajectory points is great, this means that the vehicle travels at a high speed in the section between the trajectory points.

Figure 3:
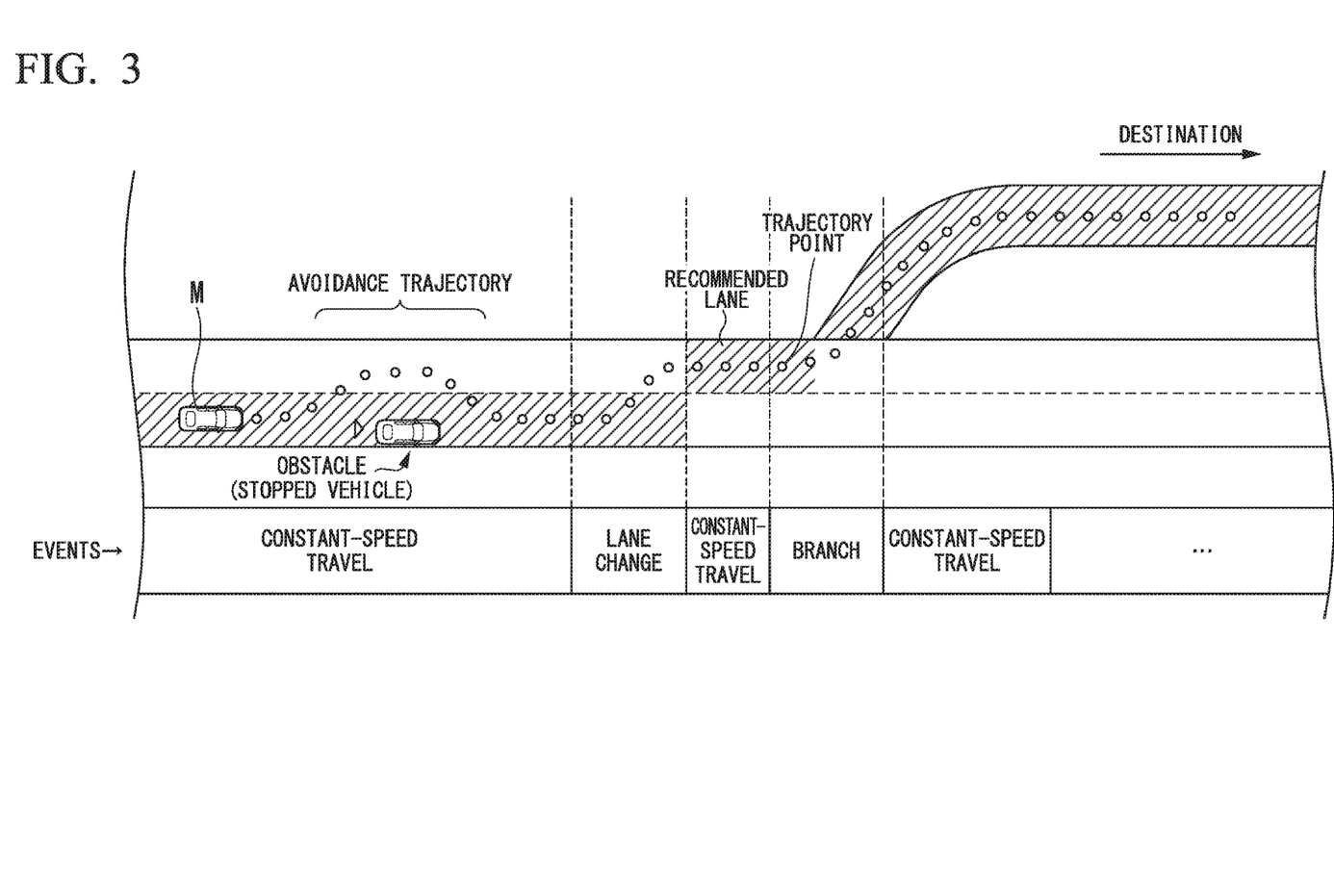
FIG. 3 is a diagram showing how a target trajectory is generated on the basis of a recommended lane.

FIG. 3 is a diagram showing how a target trajectory is generated on the basis of a recommended lane. As shown, the recommended lane is set to be convenient for traveling along the route to the destination.

When the vehicle M approaches a predetermined distance (which may be determined according to the types of events) before a point for switching to the recommended lane, the behavior plan generation unit 123 activates a lane change event, a branching event, a merging event, or the like. When it becomes necessary to avoid an obstacle during execution of each event, an avoidance trajectory is generated as shown in FIG. 3.

For example, the behavior plan generation unit 123 generates a plurality of candidate target trajectories and selects an optimum target trajectory that is suitable for the route to the destination at that point in view of safety and efficiency.

The second control unit 140 includes, for example, a travel control unit 141 and a switching control unit 142. The travel control unit 141 controls the travel driving force output device 200, the brake device 210, and the steering device 220 such that the vehicle M passes along the target trajectory generated by the behavior plan generation unit 123 at scheduled times.

The switching control unit 142 switches the driving mode of the vehicle M on the basis of the behavior plan generated by the behavior plan generation unit 123. For example, the switching control unit 142 switches the driving mode from manual driving to automated driving at a planned start point of the automated driving. The switching control unit 142 switches the driving mode from automated driving to manual driving at a planned end point of the automated driving. Upon switching the driving mode of the vehicle M, the switching control unit 142 notifies the seat belt control unit 160 of the switching of the driving mode.

The switching control unit 142 may switch between automated driving and manual driving, for example, on the basis of a switching signal input through an automated driving changeover switch included in the HMI 30. The switching control unit 142 may also switch the driving mode of the vehicle M from automated driving to manual driving, for example, on the basis of an operation performed on a driving operator 80 such as the accelerator pedal, the brake pedal, or the steering wheel to instruct that acceleration, deceleration, or steering be performed.

During manual driving, input information from the driving operators 80 is output to the travel driving force output device 200, the brake device 210, and the steering device 220. Input information from the driving operators 80 may also be output to the travel driving force output device 200, the brake device 210, and the steering device 220 via the automated driving control unit 100. Respective electronic control units (ECUs) of the travel driving force output device 200, the brake device 210, and the steering device 220 perform their operations on the basis of the input information from the driving operators 80 or the like.

The interface control unit 150 causes the HMI 30 to output a traveling state of the vehicle M during automated driving or manual driving, the timing of switching between automated driving and manual driving, a notification regarding a request for the occupant to perform manual driving or the like, etc. The interface control unit 150 may cause the HMI 30 to output information regarding control by the seat belt control unit 160.

That is, the HMI 30 displays information to the occupant in conjunction with the seat belt control unit 160. The interface control unit 150 may also output information received by the HMI 30 to the first control unit 120 or the seat belt control unit 160. For example, the seat belt control unit 160 controls the vehicle seat 310 on the basis of information received by the HMI 30 and also controls the vehicle seat 310 as will be described later when the driving mode is switched by the switching control unit 142. Details of the functions of the seat belt control unit 160 will be described later.

The travel driving force output device 200 outputs a travel driving force (torque) required for the vehicle to travel to driving wheels. The travel driving force output device 200 includes, for example, a combination of an internal combustion engine, an electric motor, a transmission, and the like and an ECU that controls them. The ECU controls the above constituent elements according to information input from the travel control unit 141 or information input from the driving operators 80.

The brake device 210 includes, for example, a brake caliper, a cylinder that transmits hydraulic pressure to the brake caliper, an electric motor that generates hydraulic pressure in the cylinder, and a brake ECU. The brake ECU controls the electric motor according to information input from the travel control unit 141 or information input from the driving operators 80 such that a brake torque corresponding to a braking operation is output to each wheel.

The brake device 210 may include, as a backup, a mechanism for transferring a hydraulic pressure generated by an operation of the brake pedal included in the driving operators 80 to the cylinder via a master cylinder.

The brake device 210 is not limited to that configured as described above and may be an electronically controlled hydraulic brake device that controls an actuator according to information input from the travel control unit 141 or information input from the driving operators 80 and transmits the hydraulic pressure of the master cylinder to the cylinder. The brake device 210 may also include a plurality of brake systems in consideration of safety.

The steering device 220 includes, for example, a steering ECU and an electric motor.

The electric motor, for example, applies a force to a rack-and-pinion mechanism to change the direction of steering wheels. The steering ECU drives the electric motor according to information input from the travel control unit 141 or information input from the driving operators 80 to change the direction of the steering wheels.

The vehicle seat 310 is an electrically drivable seat in which an occupant of the vehicle M sits. The vehicle seat 310 includes a driver's seat in which the driving operators 80 are provided, a front occupant seat, rear seats, or the like.

[Occupant Protection Device]

Hereinafter, the occupant protection device 400 according to a first embodiment will be described. The occupant protection device 400 is realized by the seat belt control unit 160 controlling the vehicle seat 310 (see FIG. 1).

Figure 4:
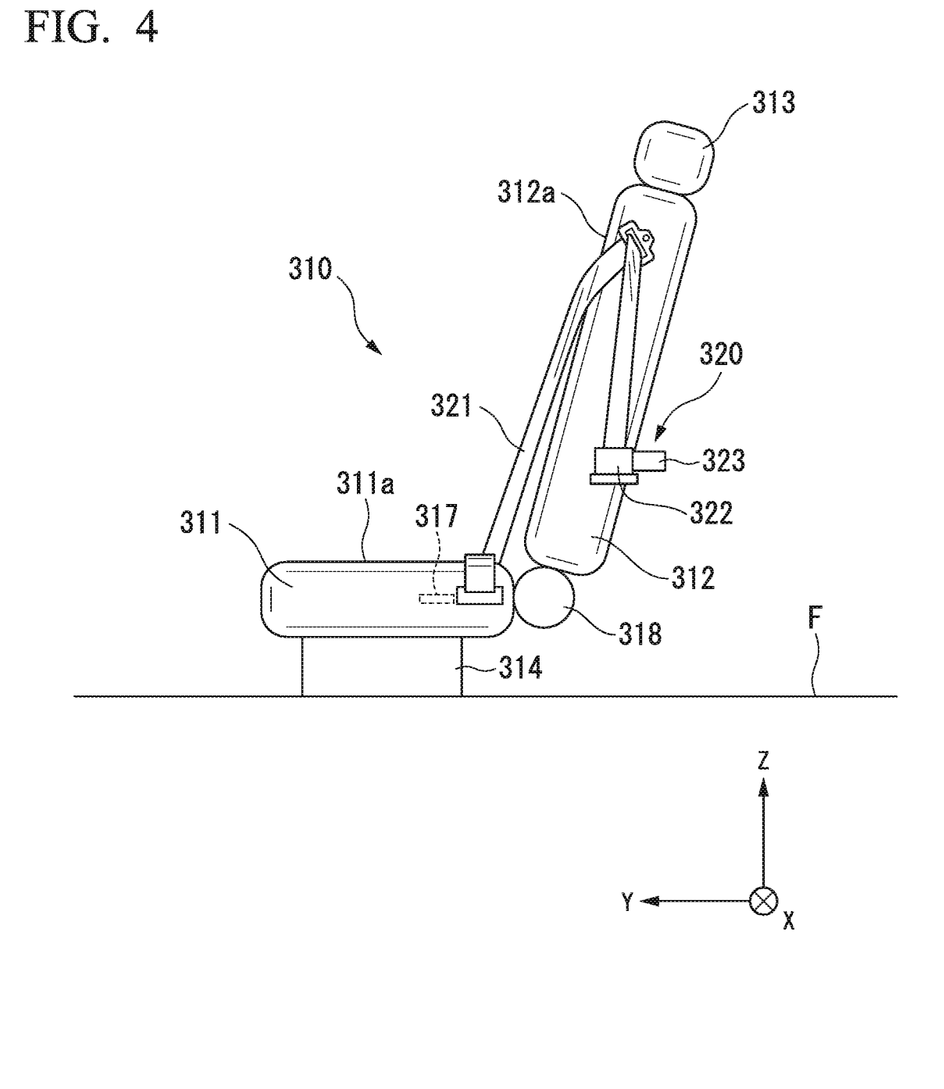
FIG. 4 is a view showing a vehicle seat of the first embodiment.

FIG. 4 is a side view showing the configuration of the vehicle seat 310 according to the first embodiment. A seat belt device 320 for protecting the occupant at the time of a collision or the like is provided on one side surface of the vehicle seat 310.

A vehicle in which the vehicle seat 310 is mounted (hereinafter referred to as a vehicle M) is, for example, a vehicle such as a two-wheeled vehicle, a three-wheeled vehicle, or a four-wheeled vehicle, and a driving source thereof is an internal combustion engine such as a diesel engine or a gasoline engine, an electric motor, or a combination thereof. The electric motor operates using electric power generated by a generator connected to the internal combustion engine or using discharge power of a secondary battery or a fuel cell.

The vehicle seat 310 includes, for example, a sitting portion 311 and a backrest portion 312. In the vehicle seat 310, one end of the sitting portion 311 and a lower end of the backrest portion 312 are rotatably connected by a first connecting portion 318. A headrest 313 is provided at an upper end of the backrest portion 312.

The sitting portion 311 is a member for supporting the lower half of the occupant's body. A sitting surface 311a in which the occupant D sits is formed on the sitting portion 311. The sitting surface 311a is formed of a cushioning material. The sitting portion 311 is attached to a floor surface F via a fixing member 314.

The backrest portion 312 is a member for supporting the torso portion of the occupant. A backrest surface 312a is formed on the backrest portion 312. The backrest surface 312a is formed of a cushioning material. A headrest 313 is provided at a distal end of the backrest portion 312. The headrest 313 supports the head or the neck of the occupant sitting on the sitting portion 311. The backrest portion 312 can be brought into a reclined state by giving the backrest portion 312 a rotation angle with respect to the floor surface F through the first connecting portion 318. The first connecting portion 318 has, for example, a rotating hinge structure.

The first connecting portion 318 includes, for example, a biasing portion (not shown) such as a rotating spring and biases the backrest portion 312 in a direction (+Y direction) in which the angle formed between the backrest portion 312 and the sitting portion 311 decreases. When a lever 317 is released, the backrest portion 312 reclines forward (in the +Y direction) around the first connecting portion 318 by the biasing force of the first connecting portion 318. When the occupant applies a force to the backrest surface 312a in a rearward direction (−Y direction) with the lever 317 released, the backrest portion 312 reclines backward around the first connecting portion 318.

Figure 5:
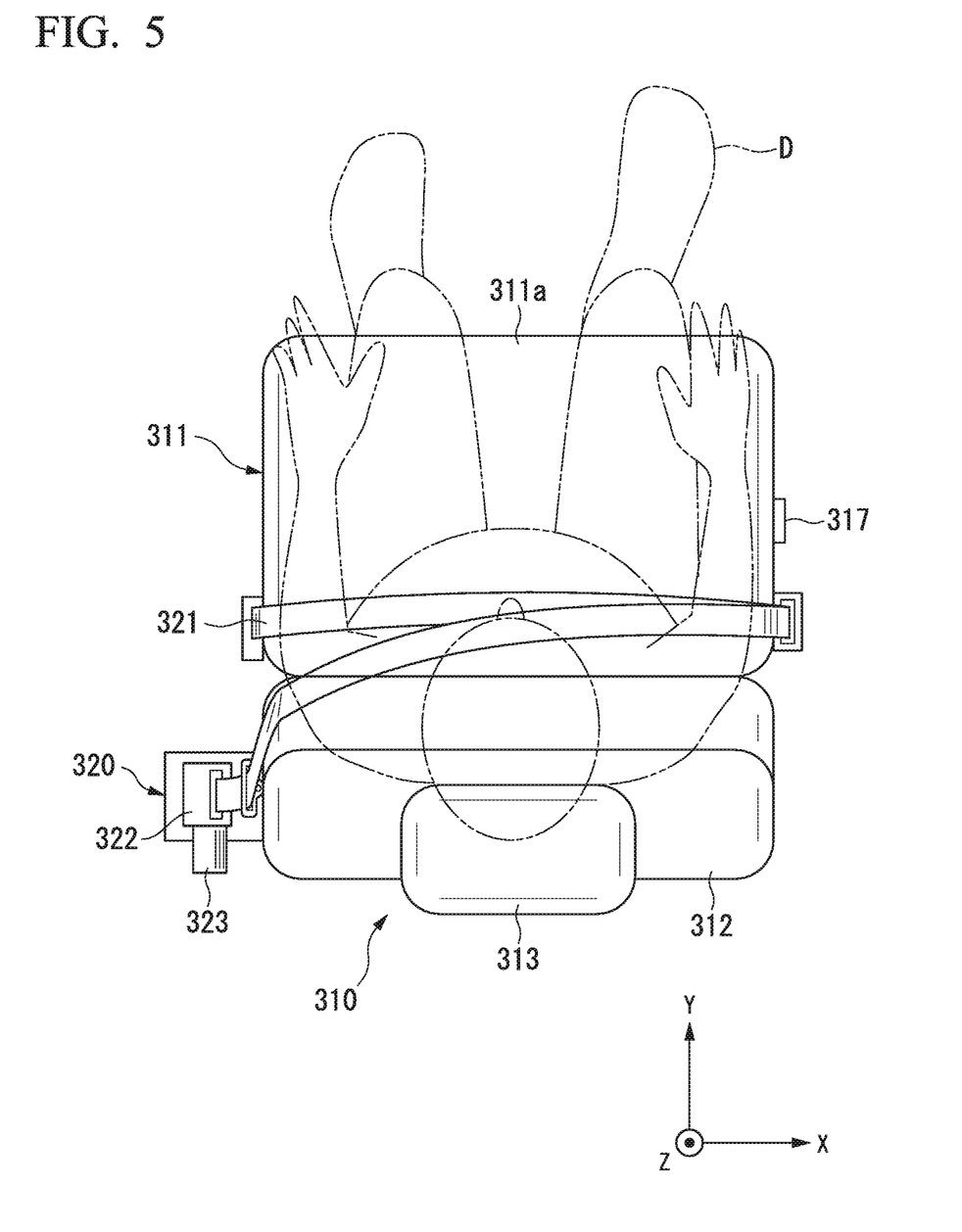
FIG. 5 is a plan view showing a configuration of a seat.

FIG. 5 is a plan view showing the configuration of the vehicle seat 310 according to the first embodiment. The seat belt device 320 is attached to one of both side surfaces of the backrest portion 312. The position of the seat belt device 320 is determined depending on whether the vehicle seat 310 is provided on the right side or on the left side with respect to the traveling direction of the vehicle M. However, the position of the seat belt device 320 is not limited to this and may be appropriately changed. The seat belt device 320 may also be provided in the backrest portion 312.

The seat belt device 320 is a three-point type seat belt and includes a belt (seat belt) 321, a winding device 322, and a drive unit 323. When the belt 321 is in an accommodated state, the belt 321 is wound and accommodated in the winding device 322. An accommodation space (not shown) for accommodating the belt 321 which is in a wound state is formed in the winding device 322.

The winding device 322 includes a biasing portion (not shown) such as a rotating spring for winding the belt 321. The belt 321 is biased in the winding direction by the biasing portion. When the occupant D fastens the belt 321, the belt 321 is kept in a tensioned state by the biasing portion of the winding device 322 and thus the looseness of the belt 321 is reduced.

The occupant D withdraws the belt 321 from the winding device 322 to bind himself or herself to the vehicle seat 310. At this time, the belt 321 tightly binds the abdomen of the occupant D to the vehicle seat 310 horizontally and also tightly binds the upper body of the occupant D diagonally. The winding device 322 mechanically locks the withdrawal of the belt 321 and restrains the occupant D to the vehicle seat 310 when an acceleration greater than a predetermined value is applied. A drive unit 323 for winding the belt 321 by a driving force is further connected to the winding device 322. The drive unit 323 is controlled by the seat belt control unit 160 as will be described later.

The drive unit 323 is connected to the rotating shaft of winding of the belt 321 and adjusts the degree of tension of the belt 321 by increasing or decreasing the tension of the belt 321 generated by the winding device 322. The drive unit 323 includes, for example, an electric motor and winds the belt 321. Control of the drive unit 323 will be described below.

Figure 6:
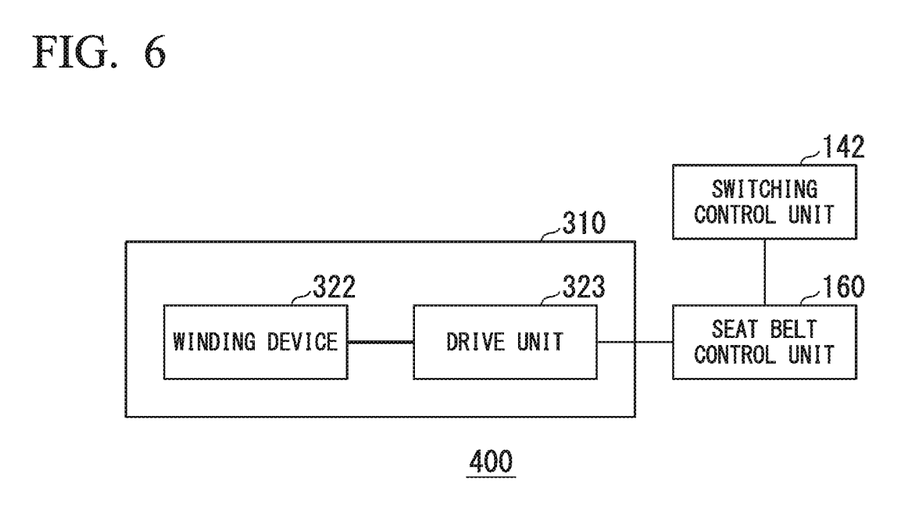
FIG. 6 is a block diagram showing a configuration of an occupant protection device.

FIG. 6 is a block diagram showing the configuration of the occupant protection device 400. The occupant protection device 400 includes the vehicle seat 310, the switching control unit 142, and the seat belt control unit 160. For example, upon switching the driving mode of the vehicle M, the switching control unit 142 notifies the seat belt control unit 160 of the switching of the driving mode. The seat belt control unit 160 controls the drive unit 323 on the basis of the notification of the driving state of the vehicle M received from the switching control unit 142 to change the degree of tension of the belt 321.

For example, when the vehicle M has been switched from manual driving to automated driving, the occupant D may sometimes recline the backrest portion 312 to relax such that the vehicle seat 310 is brought into a reclined state. Thereafter, when the vehicle M is switched from automated driving to manual driving, the occupant D raises the backrest portion 312 to return the vehicle seat 310 to the state of manual driving.

At this time, looseness may occur in the belt 321 due to the posture change of the backrest portion 312. Therefore, when the vehicle M has been switched from automated driving to manual driving, the seat belt control unit 160 controls the drive unit 323 to remove the looseness occurring in the belt 321.

When adjusting the degree of tension of the belt 321, the seat belt control unit 160 changes the degree of tension of the belt 321 during manual driving by a first amount of change to make it higher than the degree of tension of the belt 321 during automated driving. Thus, the occupant protection device 400 can improve the safety of protection of the occupant during manual driving. Similarly, when the vehicle M has been switched from manual driving to automated driving, the seat belt control unit 160 controls the drive unit 323 to remove the looseness occurring in the belt 321. Here, when the vehicle M has been switched from manual driving to automated driving, the seat belt control unit 160 does not necessarily control the drive unit 323.

"To make the degree of tension higher" is, for example, to make a target tension higher. "To make the degree of tension higher" may also be to make the amount of winding of the seat belt higher or may be a combination of these.

The seat belt control unit 160 controls the drive unit 323 to change the degree of tension of the belt 321 during automated driving by a second amount of change to make it lower than the degree of tension of the belt 321 during manual driving. That is, when the vehicle has been switched from manual driving to automated driving, the seat belt control unit 160 controls the drive unit 323 to tension the belt 321 to remove the looseness such that the degree of removal of the looseness when the vehicle M has been switched from automated driving to manual driving is higher than the degree of removal of the looseness when the vehicle M has been switched from manual driving to automated driving. As a result, the occupant protection device 400 can relax the occupant D by loosening the belt 321 during automated driving.

Figure 7:
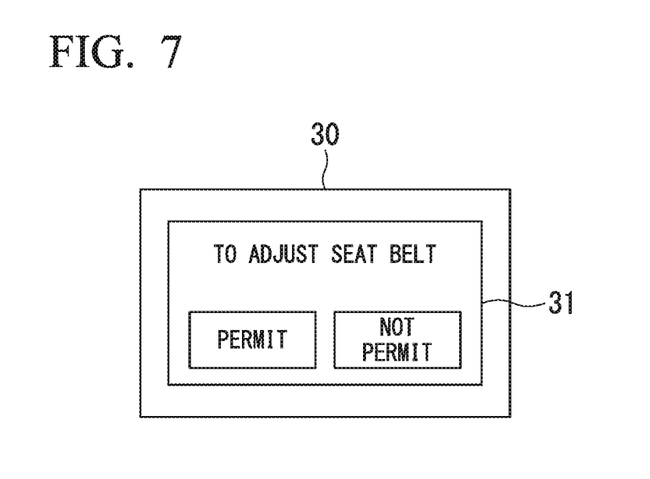
FIG. 7 is an exemplary image for notification of a change in the degree of tension of a belt which is displayed on the HMI.

The seat belt control unit 160 may cause the HMI 30 to display an image for notification of the change of the degree of tension of the belt 321 before changing the degree of tension of the belt 321. FIG. 7 is an exemplary image 31 for notification of the change of the degree of tension of the belt 321 which is displayed on the HMI 30. When the image 31 is displayed on the HMI 30, the occupant D may be allowed to select whether or not to permit the change of the degree of tension of the belt 321. In this case, the seat belt control unit 160 may change the degree of tension of the belt 321 on the basis of the permission of the occupant D.

A means for outputting information asking the occupant D whether or not to permit to change the degree of tension of the belt 321 may be a voice and an indication of the intention of the occupant D may be a gesture or voice of the occupant.

In this case, a detection unit (not shown) that detects the intention of the occupant D may be provided. The seat belt control unit 160 may change the degree of tension of the belt 321 when the detection unit has detected the intention to permit the change.

Figure 8:
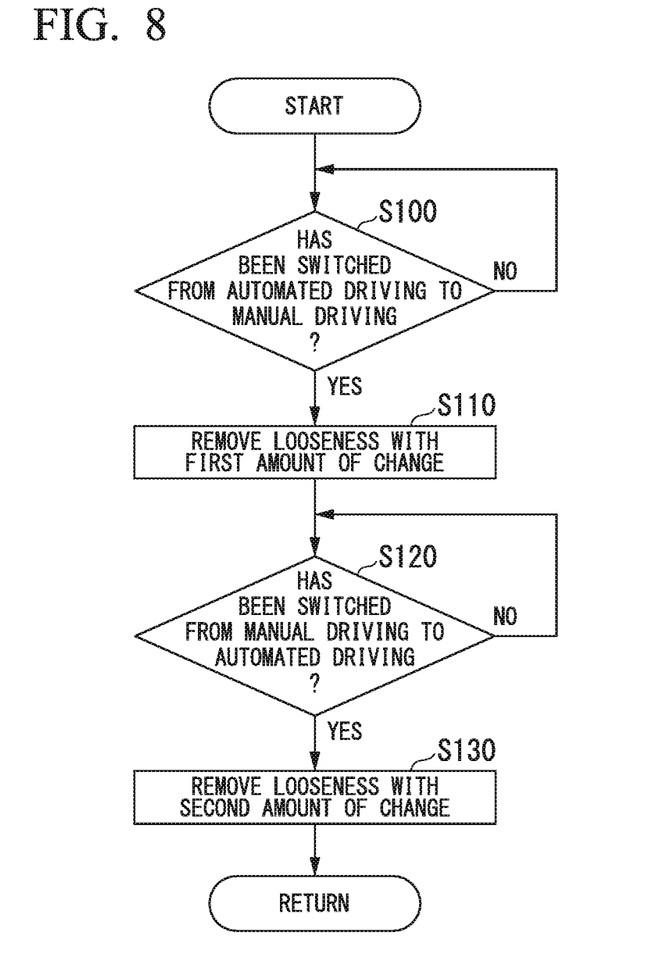
FIG. 8 is a flowchart showing a process flow for the occupant protection device.

An operation of the occupant protection device 400 will now be described. FIG. 8 is a flowchart showing a process flow for the occupant protection device 400.

Upon switching the driving mode of the vehicle M, the switching control unit 142 notifies the seat belt control unit 160 of the switching of the driving mode. The seat belt control unit 160 receives a notification indicating a change from automated driving to manual driving from the switching control unit 142 and recognizes the manual driving (step S100: Yes). The seat belt control unit 160 controls the drive unit 323 to tension the belt 321 with a first amount of change to remove looseness (step S110).

The seat belt control unit 160 receives a notification from the switching control unit 142 indicating a change from manual driving to automated driving and recognizes the automated driving (step S120: Yes). The seat belt control unit 160 controls the drive unit 323 to tension the belt 321 with a second amount of change to remove looseness (step S130).

According to the occupant protection device 400 of the first embodiment, the degree of tension of the belt 321 can be changed according to the driving mode of the vehicle M as described above. According to the occupant protection device 400, when the vehicle M is switched from automated driving to manual driving, the belt 321 is tensioned to remove the looseness and therefore the safety of protection of the occupant D can be improved.

In addition, according to the occupant protection device 400, the degree of tension of the belt 321 during manual driving is made higher than the degree of tension of the belt 321 during automated driving and therefore the safety of protection of the occupant D during manual driving can be further improved. Furthermore, according to the occupant protection device 400, the degree of tension of the belt 321 during automated driving is made lower than the degree of tension of the belt 321 during manual driving and therefore the occupant D can be relaxed during automated driving.

Second Embodiment

In the occupant protection device 400 of the first embodiment, an electric motor is used for the drive unit 323 and the degree of tension of the belt 321 is adjusted by the seat belt control unit 160. In a second embodiment, the degree of tension of the belt 321 is adjusted using a mechanical winding device instead of the electric motor for the drive unit 323. In the following description, the same names and reference signs are appropriately used for the same or similar components as in the first embodiment and redundant explanation will be omitted as appropriate.

Figure 9:
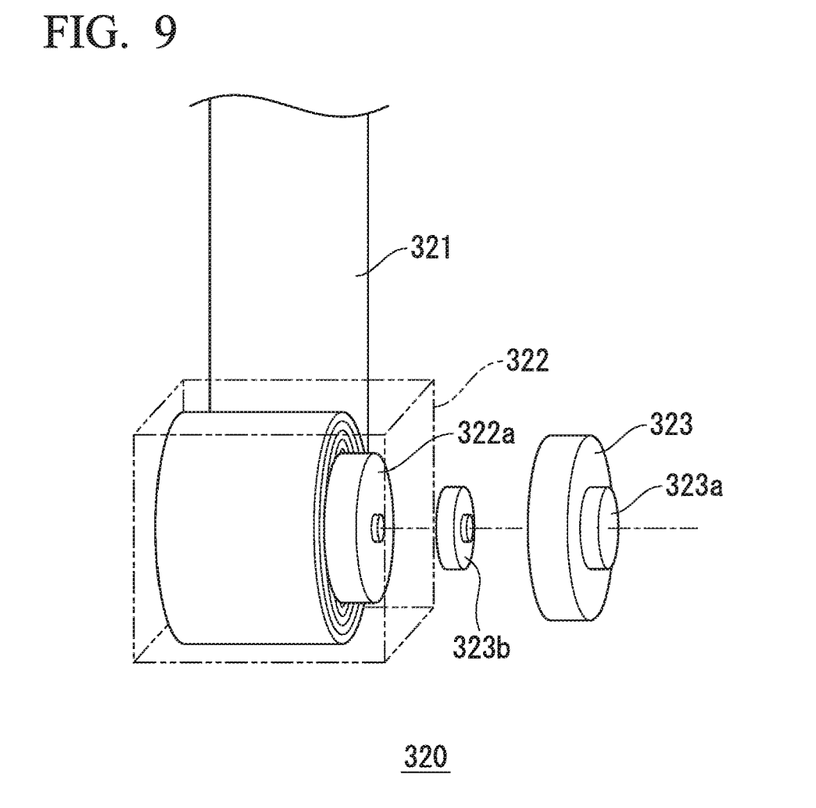
FIG. 9 is a perspective view showing a configuration of a seat belt device of a second embodiment.

FIG. 9 is a perspective view showing a configuration of a seat belt device 320 according to the second embodiment. The seat belt device 320 includes a winding device (a first winding device) 322, a drive unit (a second winding device) 323, a locking mechanism 323*a*, and a clutch mechanism 323*b*.

The winding device 322 is a mechanical winding device. The winding device 322 includes a first biasing portion 322*a* for winding the belt 321. The drive unit 323 is a mechanical winding device. The drive unit 323 is a second biasing portion for biasing the belt 321 in a winding direction.

The biasing force of the drive unit 323 is greater than the biasing force of the first biasing portion 322*a*. The drive unit 323 is provided with a locking mechanism 323*a* for locking the winding operation. The locking mechanism 323*a* is controlled by the seat belt control unit 160. In a state where no control is performed, the drive unit 323 is given a biasing force in the direction of winding the belt 321 and is locked by the locking mechanism 323*a*.

A clutch mechanism 323*b* is provided between the drive unit 323 and the first biasing portion 322*a* to connect and disconnect the winding driving forces of the drive unit 323 and the first biasing portion 322*a*.

The clutch mechanism 323*b* is controlled by the seat belt control unit 160 in conjunction with the locking mechanism 323*a*.

When the vehicle M has been switched from automated driving to manual driving, the seat belt control unit 160 controls the drive unit 323 to tension the belt 321 and remove the looseness. At this time, the seat belt control unit 160 controls the clutch mechanism 323*b* to connect the drive unit 323 and the first biasing portion 322*a*. The seat belt control unit 160 controls the locking mechanism 323*a* in conjunction with the clutch mechanism 323*b* to release the lock of the drive unit 323. Thus, the belt 321 is wound by the biasing force of the drive unit 323 and the looseness of the belt 321 is removed.

When the vehicle M has been switched from manual driving to automated driving, the seat belt control unit 160 controls the clutch mechanism 323*b* to release the connection between the drive unit 323 and the first biasing portion 322*a*. The seat belt control unit 160 controls the locking mechanism 323*a* in conjunction with the clutch mechanism 323*b* to lock the drive unit 323.

A detection means (not shown) for detecting that the occupant D is performing an operation to withdraw the belt 321 may be provided, and the seat belt control unit 160 may control the clutch mechanism 323*b* on the basis of the detection result of the detection means to connect the drive unit 323 and the first biasing portion 322*a* to each other such that the biasing force is accumulated in the drive unit 323 and the biasing force of the drive unit 323 is maintained at a constant level.

As described above, according to the occupant protection device 400 of the second embodiment, the drive unit 323 having the mechanical winding mechanism is used when the degree of tension of the belt 321 is changed according to the driving mode of the vehicle M and thus it is possible to adjust the degree of tension of the belt 321 with low electric power.

Third Embodiment

In the first and second embodiments, the degree of tension of the belt 321 is changed when the driving mode of the vehicle M is switched. In a third embodiment, looseness of the belt 321 is detected and removed regardless of the state of the driving mode of the vehicle M.

Figure 10:
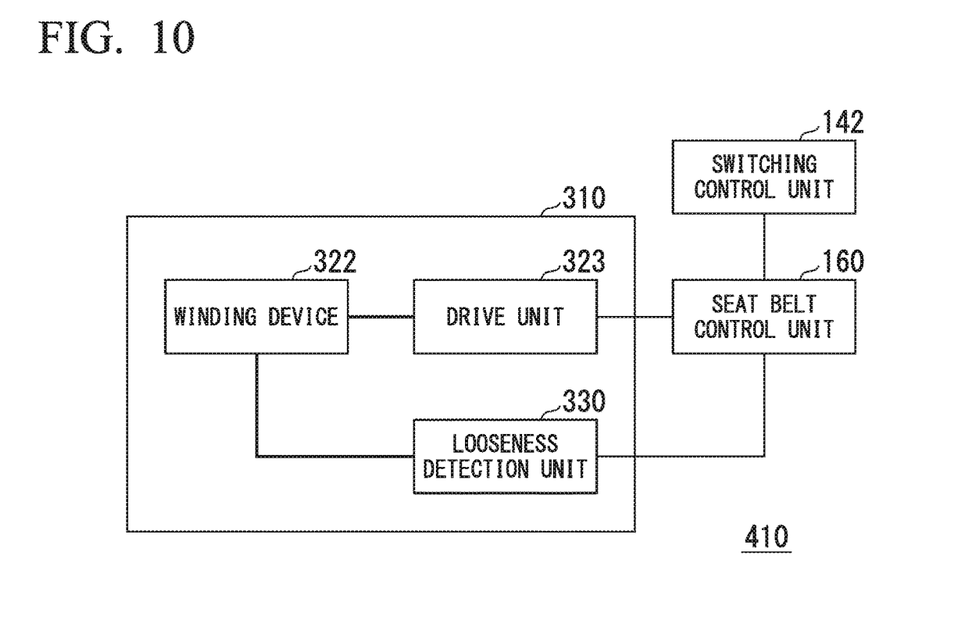
FIG. 10 is a block diagram showing a configuration of an occupant protection device of a third embodiment.

FIG. 10 is a block diagram showing a configuration of an occupant protection device 410 according to the third embodiment. The occupant protection device 410 further includes a looseness detection unit 330 in addition to the components of the occupant protection device 400 of the first embodiment. The looseness detection unit 330 is provided in the winding device 322 and detects looseness of the belt 321. When detecting looseness of the belt 321, the looseness detection unit 330 outputs the detection result to the seat belt control unit 160.

The seat belt control unit 160 controls the drive unit 323 on the basis of the detection result of the looseness detection unit 330 to wind the belt 321 and to remove looseness of the belt 321.

Figure 11:
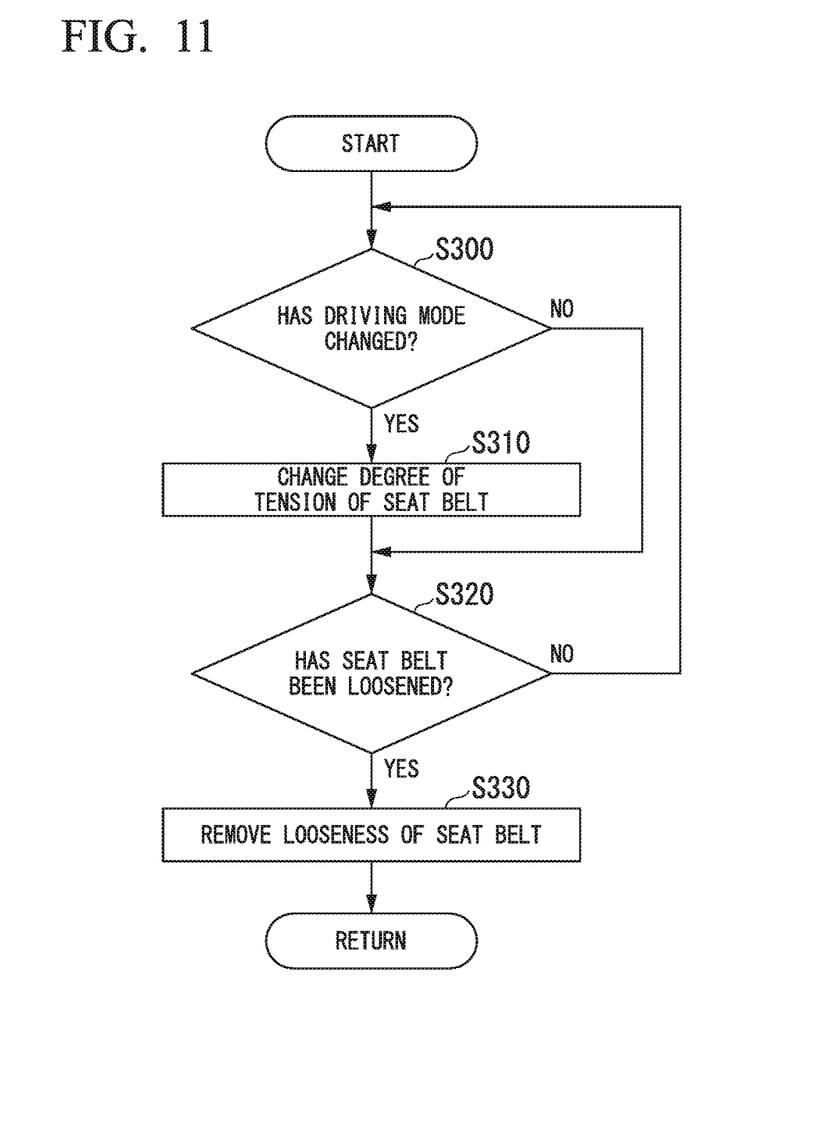
FIG. 11 is a flowchart showing a process flow for the occupant protection device.

Next, the operation of the occupant protection device 410 will be described. FIG. 11 is a flowchart showing a process flow for the occupant protection device 410. Although the descriptions of steps S300 to S310 are simplified, the processes thereof are similar to those of steps S100 to S130 of the first embodiment.

Upon switching the driving mode of the vehicle M, the switching control unit 142 notifies the seat belt control unit 160 of the switching of the driving mode. The seat belt control unit 160 receives a notification indicating a change of the driving mode from the switching control unit 142 and recognizes the change of the driving mode (step S300: Yes).

The seat belt control unit 160 controls the drive unit 323 to tension the belt 321 and to remove looseness thereof (step S310). Upon detecting looseness of the belt 321, the looseness detection unit 330 outputs the detection result. The seat belt control unit 160 recognizes the looseness of the belt 321 on the basis of the detection result of the looseness detection unit 330 (step S320: Yes). The seat belt control unit 160 controls the drive unit 323 to tension the belt 321 to remove the looseness thereof (step S330).

When the driving mode has not changed (step S300: No) and the looseness of the belt 321 is not detected (step S320: No), the seat belt control unit 160 remains ready to control the drive unit 323 by a loop processing of steps S300 and S320.

As described above, according to the occupant protection device 410 of the third embodiment, looseness of the belt 321 can be detected and removed regardless of a change of the driving mode of the vehicle M. Thus, the occupant protection device 410 can further improve the safety of protection of the occupant D.

Although the modes for carrying out the present invention have been described above by way of embodiments, the present invention is not limited to these embodiments at all and various modifications and substitutions can be made without departing from the gist of the present invention.

What is claimed is:

1. An occupant protection device comprising:
 a processor configured to:
 facilitating adjusting a degree of tension of a seat belt associated with a vehicle; and
 facilitating tensioning of the seat belt to remove looseness of the seat belt in response to a driving mode being switched from an automated driving mode to a manual driving mode,
 wherein the processor facilitates tensioning of the seatbelt to remove the looseness of the seatbelt in response to the driving mode being switched from the manual driving mode to the automated driving mode,
 such that a degree of removal of the looseness when the vehicle has been switched from the automated driving mode to the manual driving mode is higher than a degree of removal of the looseness when the vehicle has been switched from the manual driving mode to the automated driving mode.

2. The occupant protection device according to claim 1, wherein the processor is further configured to:
 facilitate outputting information; and
 facilitate determining an intention of an occupant of the vehicle,
 wherein the processor facilitates outputting of information asking whether or not to permit change of the degree of tension of the seat belt before changing the degree of tension of the seat belt and facilitating changing the degree of tension of the seat belt in response to an intention to permit the change being determined.

3. The occupant protection device according to claim 1, wherein
the processor facilitates an electric motor to change the degree of tension of the seat belt in response to the driving mode being switched from the automated driving mode to the manual driving mode.

4. The occupant protection device according to claim 3, wherein the electric motor is configured to:
wind the seat belt with a first biasing force greater than a second biasing force used to wind the seat belt; and
lock the seat belt at the first biasing force,
wherein the electric motor facilitates adjusting the degree of tension of the seat belt.

5. The occupant protection device according to claim 1, wherein the processor is further configured to facilitate detection of the degree of tension of the seat belt,
wherein the processor facilitates tensioning of the seat belt in response to determining that the seat belt has become loose.

6. A method for controlling an occupant protection device comprising an electric motor configured to adjust a degree of tension of a seat belt, the method comprising:
causing a processor of the occupant protection device to facilitate tensioning of the seat belt to remove looseness of the seat belt in response to a driving mode being switched from an automated driving mode to a manual driving mode,
wherein the processor facilitates tensioning of the seatbelt to remove the looseness of the seatbelt in response to the driving mode being switched from the manual driving mode to the automated driving mode,
such that a degree of removal of the looseness when the vehicle has been switched from the automated driving mode to the manual driving mode is higher than a degree of removal of the looseness when the vehicle has been switched from the manual driving mode to the automated driving mode.

7. A non-transitory computer readable medium storing program that causes a processor of an occupant protection device comprising an electric motor configured to adjust a degree of tension of a seat belt, to perform:
facilitating tensioning of the seat belt to remove looseness of the seat belt in response to a driving mode being switched from an automated driving mode to a manual driving mode,
wherein the processor facilitates tensioning of the seatbelt to remove the looseness of the seatbelt in response to the driving mode being switched from the manual driving mode to the automated driving mode,
such that a degree of removal of the looseness when the vehicle has been switched from the automated driving mode to the manual driving mode is higher than a degree of removal of the looseness when the vehicle has been switched from the manual driving mode to the automated driving mode.

* * * * *